Dec. 15, 1931.  W. S. NICHOLS ET AL  1,836,386
LAWN MOWER
Filed Dec. 27, 1927  2 Sheets-Sheet 1
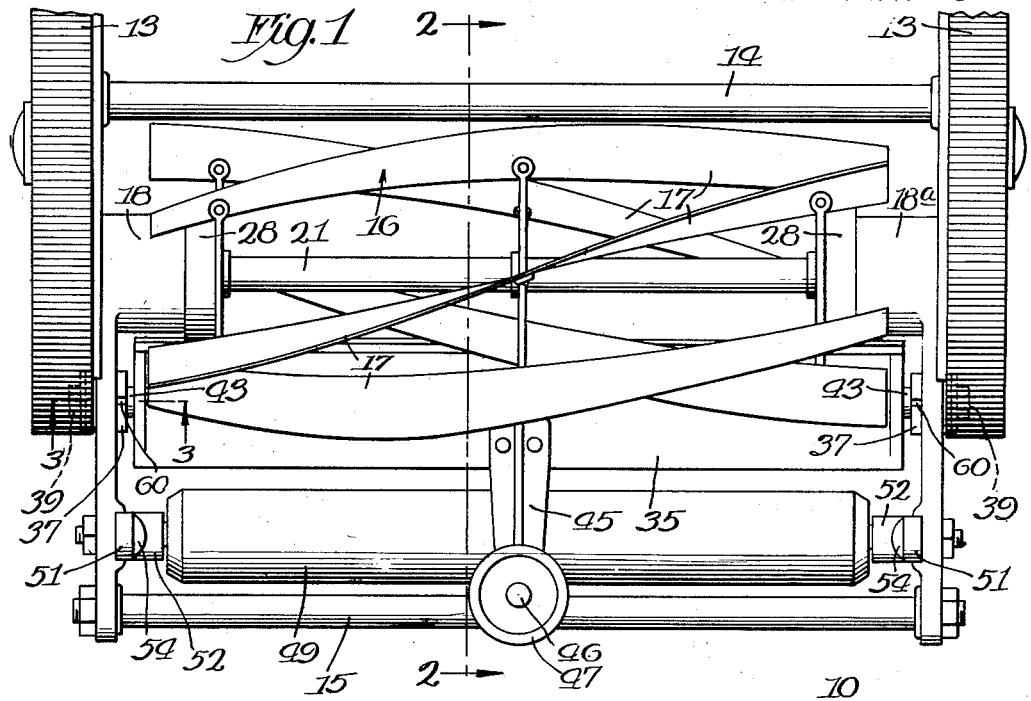
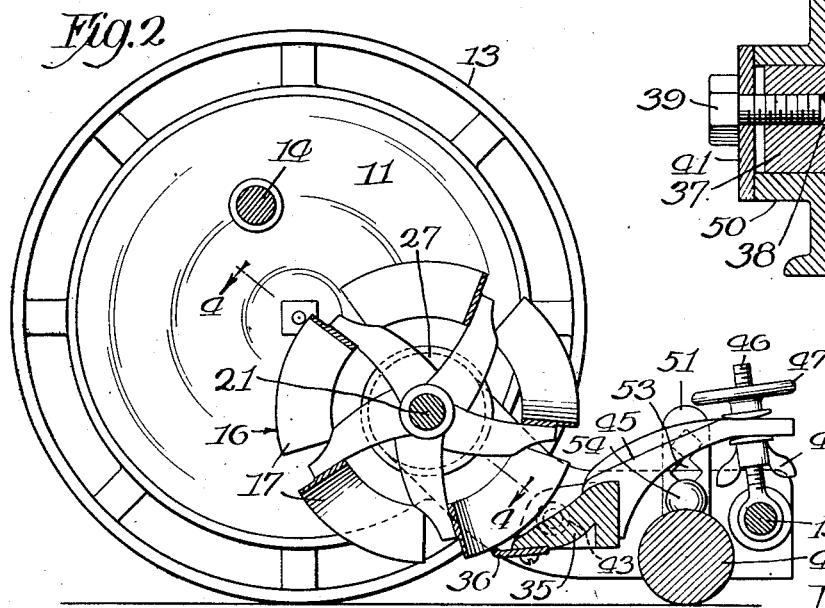
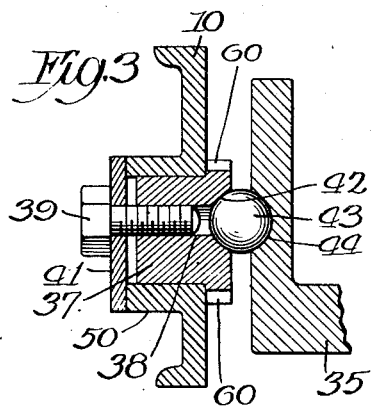
Inventors
Winfield Scott Nichols
Harry D. Miller
By Gillson, Monroe Cox Attys.

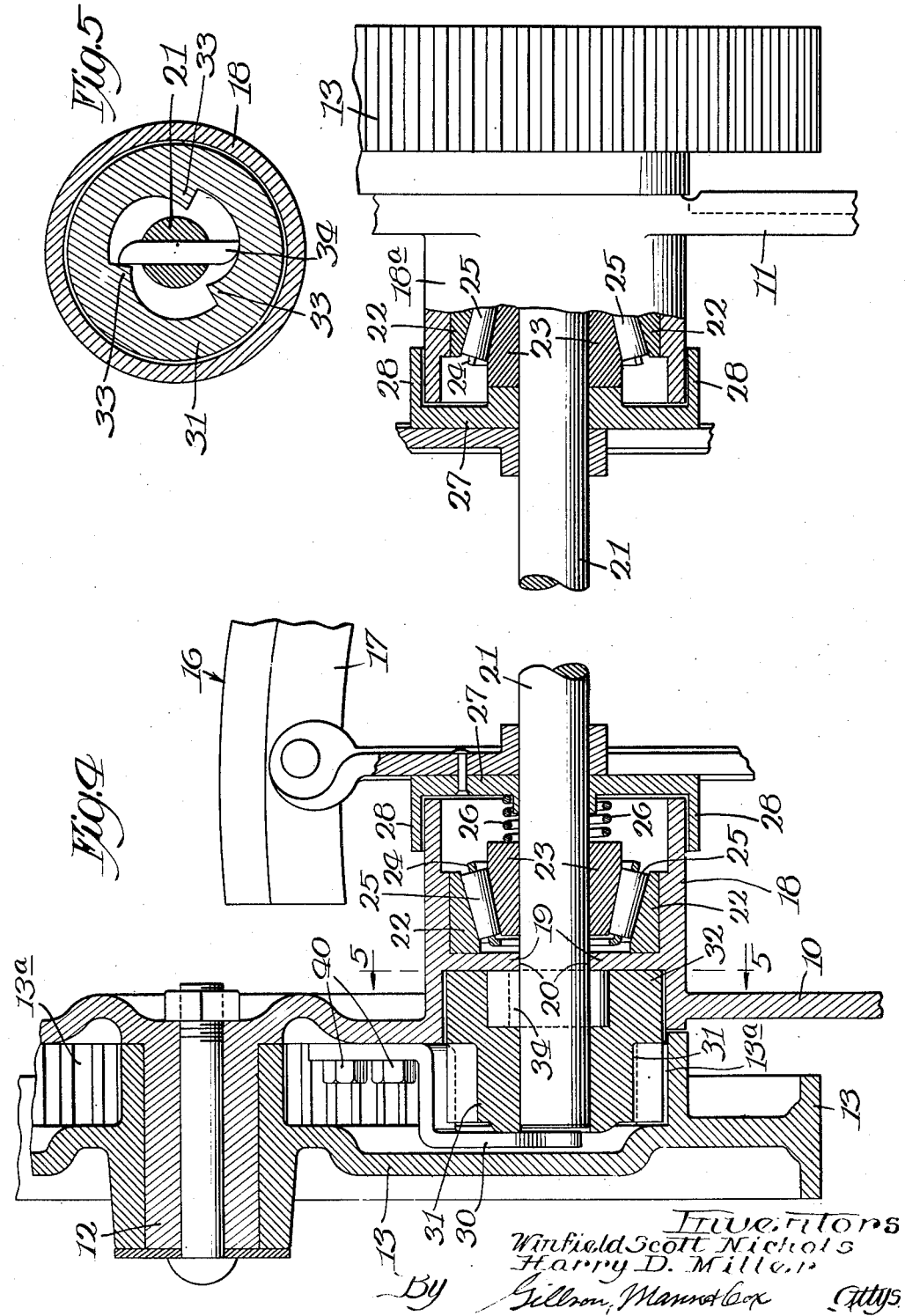

Patented Dec. 15, 1931

1,836,386

UNITED STATES PATENT OFFICE

WINFIELD SCOTT NICHOLS AND HARRY D. MILLER, OF SANDWICH, ILLINOIS, ASSIGNORS, BY MESNE ASSIGNMENTS, TO THE NEW IDEA SPREADER COMPANY, OF COLDWATER, OHIO, A CORPORATION OF OHIO

LAWN MOWER

Application filed December 27, 1927. Serial No. 242,604.

This invention relates to that class of machines known to the trade as lawn mowers.

One of the principal objects of the invention is the provision of new and improved means for adjusting the cutter bar to and from the movable cutter blades.

Another object of the invention is the provision of new and improved means for mounting and adjustably supporting the ends of the cutter bar in position.

A further object of the invention is the provision of a new and improved frame construction together with new and improved means for holding the parts in assembled relation.

Still other objects of the invention are the provision of a new and improved lawn mower that is cheap to manufacture, easily assembled, efficient in operation, capable of fine adjustment, rugged in construction, that may be readily and easily adjusted, and that may be operated with a minimum expenditure of energy.

Other and further objects and advantages of the invention will appear from the following description taken in connection with the accompanying drawings, in which Fig. 1 is a plan view of the device with the operating handle removed and with parts broken away;

Fig. 2 is a section on line 2—2 of Fig. 1;

Fig. 3 is a section on line 3—3 of Fig. 1;

Fig. 4 is a section substantially along the line 4—4 of Fig. 2 with parts broken away and parts in full lines; and Fig. 5 is a section on line 5—5 of Fig. 4.

On the drawings, the reference characters 10 and 11 designate the side frame members or side plates of the machine, each of which is provided with a hub 12 on which is mounted a wheel 13 as is usual in such constructions. A brace member 14 is adapted to connect said frame members together and to hold them in spaced relation.

In the frames of lawn mowers as heretofore constructed more or less difficulty has been experienced in maintaining the same rigid so as to prevent it from twisting or warping while in use. In order to overcome this difficulty these frame members are provided with rearward extensions and a brace rod 15 provided for connecting their extreme rear ends together, holding them rigidly in fixed spaced relation.

The machine is provided with the usual rotating cutter member 16 having the cutter blades 17 of any well known construction.

It is desirable that the cutter member be so mounted that it will always run true and smoothly. In order that lawn mowers may run smoothly and cut properly, it is necessary that the cutting blades be capable of minute and accurate adjustments. Properly operating lawn mowers are necessarily machines of more or less precision. If the stationary cutter bar be adjustable, it is necessary that means be provided for independently adjusting the ends of said bar so as to take care of any inequality of wear at the ends of the cutter, and other means must also be provided for bodily adjusting the blade to and from the moving cutter blades.

In order to accomplish these functions, the rotating cutter member, in the present invention, is journaled in stationary bearings, and the cutter bar is adjustable. The rotating cutter member will now be described.

The side frame members 10 and 11 are each provided with inwardly extending hub members 18 and 18a respectively. Since the hub members are identical, only one need be described. As shown, the hub 18 is provided with a partition 19 having an axial opening 20 through which the shaft 21 extends. The cutter member 16 is rigidly connected to this shaft. An anti-friction bearing is inserted in the inner end of the hub, for the shaft 21. This bearing comprises the outer race 22 nonrotatably mounted within the inner end of the hub, and an inner race 23 slidably mounted on the shaft 21. A suitable cage 24 with bearing members, as the rollers 25, are interposed between the races 22 and 23, as is usual in such constructions. The race 23 is held in position by a spring 26. By means of this arrangement all wear is automatically taken up and the parts held in accurate adjustment at all times. The spring arrangement may be duplicated at the other end of the shaft 21, if desired, although this is not necessary, as the one spring reacting on the cutter member will force the inner race 23 which is fast on the shaft 21 toward the right in Fig. 4 for taking up all wear in the anti-friction bearing at that end of said shaft.

In order to prevent grass and weeds from entering between the ends of the rotating cutter and the bearing and winding about the shaft as they often do during the mowing of tall grass and weeds, the ends of the hubs are covered by the cup shaped members 27. These members are rigidly attached to the spider of the rotating cutter and are provided with annular flanges 28 which lap over the ends of the hubs 18 and 18a a considerable distance. This is considered an important feature because the hubs being of relatively large diameter and the flanges overlapping the same a considerable distance, strings, grass, weeds and the like wrapping about the flanges and hubs cannot get between the rotating cutter member and its bearing to interfere with the free rotation of said member.

The rotary cutter member 16 is operated in the usual manner by a pinion 31 loosely mounted on each end of the shaft 21. These pinions engage internal gears 13a on the wheels 13 in the usual manner. They are held on the ends of the shaft 21 by clip 30 secured to the frame members as by bolts 40, see Fig. 4, and have their free ends offset and extended over the outer ends of the hubs of these pinions. The pinions have hubs 32 having internal ratchet teeth 33, see Fig. 5, which are adapted to engage pawls 34 slidably mounted in openings extending through the ends of the shaft 21, as is common in such constructions.

A stationary cutter bar 35, provided with a cutter blade 36 for cooperating with the rotating cutter blades 17 in the usual manner, is adjustably mounted on the side frame members as will now be described.

Each side frame 10 and 11 is provided with a hub 50 having a circular opening in which a cylindrical plug 37 is adapted to be mounted. The plug is provided with a bore 38 parallel with but eccentric to the axis of the plug. The bore is threaded for receiving the screw-threaded bolt 39 extending through a cap 41, extending across the outer end of the hub 50. The inner end of the bore 38 is enlarged as at 42 for forming a seat for one side of the ball member 43. The adjacent cutter bar is also provided with a curved recess 44 for forming a seat for the opposite side of the ball 43. The outer end of the plug member 37 may, if desired, be provided with notches 60 for receiving a tool for adjusting the plug. The being what, for convenience of description, will be termed eccentrically mounted, in the hub 50, either end of the outer bar may be raised or lowered independently of the other for adjusting said bar relative to the rotating cutter blades.

The ball connections will permit this adjustment without straining the parts in any manner whatsoever.

It has been proposed to employ conical hubs and sockets for this adjustment, but unless the two ends are adjusted together there is more or less binding of the parts and inaccuracy of adjustment. But with the ball arrangement it is immaterial whether the ends of the cutter bar are adjusted independently or simultaneously.

Suitable means are also provided for tilting the cutter bar about its horizontal axis. As shown, this is accomplished by providing a rearwardly extending arm or extension 45 on the cutter bar 35. The rear end of the arm 45 is provided with an opening through which an adjusting rod 46 extends. The rod 46 is mounted on the brace rod 15 and is provided with thumb nuts 47 and 48 above and below the arm 45, respectively. Only one arm 45 is necessary, although a plurality may be employed if desired. A single arm is preferably employed, and by means of the two nuts 47 and 48 an exceedingly fine adjustment of the cutter blade 36 to and from the blades 17 may be accomplished. Furthermore, the arm 45, being connected to the brace 15, the frame of the machine is rendered exceedingly rigid, whereby the almost accurate adjustments of the cutter blade may be accomplished, with a minimum amount of time and labor.

A roller 49 is adjustably mounted on the frame members in any suitable manner. As shown, a pair of brackets 51 provided with bearings 52 for receiving the journals of the roller 49 are provided. The brackets have each a slot or plurality of openings 53 for receiving bolts 54 for adjustably connecting the brackets to the frame members in the manner well known in the art.

Attention is directed to the fact that the brace 15 is located rearwardly of the roller. This not only provides a stronger and more rigid frame but permits the use of a longer adjusting arm 45 whereby finer adjustment of the cutter blade 36 may be made.

It will thus be seen that a machine has been produced that is exceedingly rigid and that the cutting edges may be adjusted both by raising and lowering the ends of the cutter bar and by tilting the bar.

It is thought from the foregoing taken in connection with the accompanying drawings that the construction and operation of our device will be apparent to those skilled in the art, and that various changes in size, shape, proportion and details of construction may be made without departing from the spirit and scope of the appended claims.

We claim as our invention:

1. In a lawn mower provided with side plates, a cutter bar, and means for adjustably mounting said bar on said plates, said means comprising a plug eccentrically mounted in each of said plates and adapted to be rotatably adjusted for independently adjusting the ends of said bar, and a ball member between the outer end of each plug and the adjacent cutter bar.

2. In a lawn mower having side frame members, a rotating cutter journaled in hubs in said side frame members, anti-friction bearings within said hubs for said cutter, resilient means for automatically adjusting one of said bearings for compensating for the wear therein and cup-shaped members on the ends of said rotary cutter for extending over the inner ends of said hubs.

3. In a lawn mower, a pair of side frames, wheels for supporting the same, a rotating cutter comprising a spider with cutter blades attached thereto, hubs on said frames and roller bearings in said hubs for journaling said rotating cutter therein, and cup shaped members on the ends of said spider for extending over the inner ends of said hubs.

4. In a lawn mower, a pair of side frames, wheels for supporting the same, hubs extending inwardly from said frames, a rotating cutter comprising an axle journaled in said hubs, cutter blade holding members extending outwardly from said axle, and shield members between said hubs and blade holding members, said shield members having annular flanges extending over the ends of said hubs.

5. In a lawn mower, a pair of side frames, a cutter bar, and means for adjustably mounting said cutter bar on said frame, said means including an eccentric bearing and a ball member.

6. In a lawn mower having side frame members, a rotating cutter journaled in hubs in said side frame members, cup-shaped members on the ends of said rotating cutter, said members having annular flanges extending over the ends of said hubs.

In testimony whereof we affix our signatures.

WINFIELD SCOTT NICHOLS.
HARRY D. MILLER.